United States Patent [19]

Hoge et al.

[11] Patent Number: 5,859,096
[45] Date of Patent: Jan. 12, 1999

[54] ROOM TEMPERATURE STORAGE-STABLE, HEAT-CURABLE, LOW CTE, ONE COMPONENT EPOXY RESIN TOOLING MATERIAL

[75] Inventors: James Edward Hoge; Teruko Uchimi Miyazaki, both of Okemos; Rajan Eadara, Ann Arbor, all of Mich.

[73] Assignee: Ciba Specialty Chemicals Corporation, Tarrytown, N.Y.

[21] Appl. No.: 820,822

[22] Filed: Mar. 19, 1997

Related U.S. Application Data

[60] Provisional application No. 60/013,970 Mar. 2, 1996.

[51] Int. Cl.⁶ ........................................ C08L 63/00
[52] U.S. Cl. .......................... 523/427; 523/219; 523/428; 523/466
[58] Field of Search .................... 523/428, 427, 523/219, 466

[56] References Cited

U.S. PATENT DOCUMENTS

| | | | |
|---|---|---|---|
| 3,395,121 | 7/1968 | Pfann et al. | 260/47 |
| 3,784,647 | 1/1974 | Fleming et al. | 260/830 TW |
| 4,528,305 | 7/1985 | Henry | 523/219 |
| 4,546,067 | 10/1985 | Lerving et al. | 430/325 |
| 4,659,779 | 4/1987 | Bagga et al. | 525/118 |
| 4,973,648 | 11/1990 | Hofer et al. | 528/94 |
| 5,137,940 | 8/1992 | Tomiyoski et al. | 523/220 |
| 5,359,020 | 10/1994 | Brynner et al. | 526/262 |
| 5,470,896 | 11/1995 | Wegmann et al. | 523/428 |

FOREIGN PATENT DOCUMENTS

| | | |
|---|---|---|
| 1272346 | 7/1990 | Canada . |
| 0115471 | 8/1984 | European Pat. Off. . |
| 0279516 | 8/1988 | European Pat. Off. . |
| 0353103 | 1/1990 | European Pat. Off. . |
| 2139291 | 2/1972 | Germany . |
| 4003842 | 8/1990 | Germany . |
| 8101857 | 7/1981 | WIPO . |
| 8200651 | 3/1982 | WIPO . |

OTHER PUBLICATIONS

Ellis, Chemistry & Technology of Epoxy Resins, pp. 24–27, 118–125, 232–235, 318–319.

*Primary Examiner*—Frederick Krass
*Attorney, Agent, or Firm*—David R. Crichton

[57] ABSTRACT

The present invention pertains to a one component curable epoxy resin composition which is storage-stable at ambient temperature and which maintains a post-cured high glass transition temperature (Tg) of above 130° C. and a low coefficient of thermal expansion (CTE) of less than $1.76 \times 10^{-5}$ cm/cm/°C. over a temperature range of −30° to 125° C., and thus finds practical utility in tooling applications. The epoxy resin composition comprises an epoxy resin or mixture thereof, a multifunctional epoxy resin diluent, a boron trichloride amine complex, and at least one filler selected from the group consisting of a silica or a silicate. The invention also relates to the cured product.

25 Claims, No Drawings

ROOM TEMPERATURE STORAGE-STABLE, HEAT-CURABLE, LOW CTE, ONE COMPONENT EPOXY RESIN TOOLING MATERIAL

This application claims the benefit under 35 U.S.C. 119(e) of U.S. Provisional Application No. 60/013,970, filed Mar. 2, 1996.

The instant invention relates to one component curable epoxy resin compositions which are useful in tooling applications. The epoxy resin compositions in accordance with the instant invention exhibit excellent storage stability at ambient temperature (40° C. and below) while the post-cured compositions made therefrom retain the following characteristics: high glass transition temperature (Tg), low coefficient of thermal expansion (CTE) and good toughness and machinability.

BACKGROUND OF THE INVENTION

A number of different tooling applications exist. For example, the term tooling includes uses as diverse as making a working model of the part to be produced, a model from which the part is produced, a mold in or from which the part is produced, equipment used to form under heat and/or pressure a contour in sheet metal or plastic, or an accessory item used for guiding and checking other production operations. To be, for example, an acceptable modeling stock, a material must have such properties that its dimensions are unchanged over a wide variation in external conditions such as temperature and humidity so that the dimensions of a workpiece made from such stock can meet the increasingly rigid specifications imposed by end-use considerations such as those of the aerospace or automobile industries.

Laminated wood modeling stock and plaster models would presumably have some advantage of cost and ease of working, but wood models made from such stock can swell and warp when exposed to adverse external weather conditions, especially high temperature and humidity, causing the parts and tools made from such wood models to be out of tolerance. Plaster models are fragile.

Metals, particularly aluminum, clearly overcome the problems associated with laminated wood modeling stock, but metal is relatively expensive, heavy and slow to machine to the desired shape. Despite these drawbacks, a metal such as aluminum remains as a standard modeling stock for preparing large workpieces of exact dimensions.

The use of epoxy resins in tooling-type applications is known in the art. Epoxy tooling often results in a considerable reduction in tooling costs and time as compared to metal tooling and is described in chapter 18 of the *Handbook of Epoxy Resins*, 1982 Reissue, Lee and Neville (1967). However, hitherto known one component curable epoxy resin tooling materials have an unacceptable storage stability at room temperature, thereby necessitating storage thereof at controlled low temperature conditions (i.e., refrigeration) at great expense and effort to the industry.

Attempts have been made to improve the storage stability of one component curable epoxy resin tooling material. For example, it is known that some imidazoles and amine salts provide some limited storage stability at room temperature. However, the stability of such systems is typically only a few days maximum at temperatures of 40° C. Furthermore, with the observance in the improvement of room temperature storage stability of the epoxy resin comes a concomitant loss of properties which are undesirable in the end-use cured product produced therefrom such as unacceptable heat resistance (a low Tg) and an unacceptable lack of retention of dimensional stability during the heat cycle (high CTE). Another concern associated with such systems is a greater possibility of an exotherm during bulk storage due to the higher reactivity of the system.

Surprisingly, a one component curable epoxy resin tooling material can be obtained in accordance with the instant invention which substantially eliminates the disadvantages encountered with conventional one-component epoxy resin systems useful in the tooling industry. Notably, the instant curable epoxy resin compositions can be stored for prolonged periods of time (i.e., at least four months) at ambient temperature (40° C. or below) in conjunction with maintaining post-cured properties such as good heat resistance (high Tg), good dimensional stability during the heat cycles (low CTE) and good toughness and machinability. The epoxy resin compositions in accordance with the instant invention are machinable to a smooth surface without chipping or cracking. The instant epoxy resin compositions are comprised of epoxy resins, an epoxy resin diluent, a latent curing agent, fillers and optionally processing aids and toughening agents.

OBJECTIVES OF THE INVENTION

One objective of the present invention is to provide a one-component epoxy resin composition material which is useful in tooling applications which is stable at ambient temperature for prolonged periods of time and which retains industrially acceptable post-cured properties such as a high Tg and low CTE.

Another objective is to provide a cured epoxy resin system which meets the stringent requirements of the tooling industry.

Yet another objective is to provide a one-component base resin system which is storage stable at ambient temperature.

Other objectives and advantages of this invention will become apparent from the more detailed description presented below.

DETAILED DESCRIPTION OF THE INVENTION

The present invention relates to a one component curable epoxy resin composition which is storage-stable at ambient temperature for prolonged periods of time and which maintains a post-cured high glass transition temperature (Tg) and a low coefficient of thermal expansion (CTE), which composition comprises an epoxy resin or mixture thereof, an epoxy resin diluent, a latent curing agent and a filler. A high Tg is herein defined as a Tg greater than 130° C. A low CTE is defined by a CTE which is less than $1.7 \times 10^{-5}$ cm/cm/°C. over a temperature range of $-30°$ to 125° C. Storage stability is herein defined as retention of handling properties for a minimum of four months, preferably a minimum of one year, at room temperature (25° C.), or up to six months at 40° C., and can be measured by known methods such as viscosity, melting point, gel time or reproducibility of cured resin properties after storage.

More particularly, the instant invention pertains to an epoxy resin composition which is storage-stable at ambient temperature and which maintains a high post-cured glass transition temperature (Tg) and a low coefficient of thermal expansion (CTE). The composition comprises (A) an epoxy resin or mixture thereof, (B) a multifunctional epoxy resin diluent;

(C) a boron trichloride amine complex; and (D) at least one filler selected from the group consisting of silicas or silicates.

In order to attain the objectives of this invention, a number of critical parameters must be met. To meet the stringent requirements for the coefficient of linear thermal expansion in the cured composition at temperature ranges of (−30° C.–125° C.), the instant epoxy resin composition must also have a high Tg value. The glass transition temperature (Tg) of the cured epoxy resin compositions is over 130° C., preferably over 140° C., and most preferably over 150° C. The uncured epoxy resin composition is preferably in the form of a pourable liquid, or at least a moldable semi-solid, for practical utility.

To achieve such Tg values and to maintain a pourable or semi-solid composition, it is necessary to use at least one epoxy resin as component (A) which is liquid or semi-solid at room temperature and which contains a large proportion of multifunctional epoxy resins in combination with the instantly selected combination of a boron trichloride amine complex as the latent curing agent and a silica or silicate compound as the filler. The judicious addition of the carefully selected combination of the latent curing agent and the filler is necessary in order to achieve the low CTE values and high Tg values required for tooling applications while at the same time maintaining storage-stability at ambient temperature.

The expression "liquid or semi-solid epoxy resin" are known per se to those skilled in the art, and most products are commercially available. Examples of epoxy resins which are liquid or semi-solid at room temperature useful as component (A) include, but not limited to, epoxy phenol novolacs (such as EPN 1138, epoxy value 0.55–0.57 eq/100 g, from Ciba-Geigy; EPN 1139, epoxy value 0.56–0.58 eq/100 grams, from Ciba-Geigy; or DEN 438, epoxy value 0.55–0.57 eq./100 grams from DOW Chemicals); 2,2-bis(p-glycidyloxyphenyl)propane (such as ARALDITE 6010, epoxy value 0.52–0.55 eq./100 grams, from Ciba-Geigy; or ARALDITE 7072, epoxy value 0.143–0.183 eq./100 grams); 1,4-diglycidyloxybutane (such as ARALDITE RD-2, from Ciba-Geigy); 4-vinyl-1-cyclohexene dioxide (such as ARALDITE RD-4, from Ciba-Geigy); N,N,O-triglycidyl-p-aminophenol (such as Epoxy Resin 0500, from Ciba-Geigy); N,N,N',N'-tetraglycidyl-4,4'-diaminodiphenylmethane (such as ARALDITE MY 720, from Ciba-Geigy) and 1,1,2,2-tetrakis(p-glycidyloxphenyl)-ethane.

Preferably, the epoxy resins useful as component (A) are epoxy phenol novolacs.

Preferably, two or more epoxy resins are used in component (A), preferably at least one being an epoxy phenol novolac. Particularly preferred is a mixture of at least two epoxy phenol novolac resins as component (A).

The epoxy resin diluent is present in order to adjust the viscosity of the resin component to the desired degree. Suitable aliphatic or aromatic multifunctional reactive epoxy resin diluents useful as component (B) are butanediol diglycidyl ether, diglycidyl ether of ortho toluidine, diglycidyl ether of neopentyl glycol. These products are well known and most are commercially available.

Preferably, the diluent is a difunctional epoxy resin diluent, most particularly butanediol diglycidyl ether.

The latent curing agent of component (C) which has been found to be particularly effective in achieving the objects of the instant invention is a boron trichloride amine complex. One example of such a complex is a boron trichloride amine complex sold under the trade designation DY 9577 (available from Ciba-Geigy Corporation, Tarrytown, N.Y.). Boron trichloride complexes are well known in the art, and many are commercially available.

The instant fillers of component (D) are materials which are essentially not affected by moisture and are well known in the art. The filler is employed to minimize shrinkage of the tooling material after cure. Particularly effective fillers are silica, aluminum silicate, calcium silicate, borosilicate glass, and the like. Some specific examples of such fillers include Spheriglass No. 3000E solid borosilicate glass spheres (available from the PQ Corporation, Valley Forge, Pa.) and K-37 Soda-lime-borosilicate glass bubbles (available from Minnesota Manufactuirng and Mining Co., St. Paul, Minn.). Preferably, the filler particles are in finely divided form.

Some useful ranges of components (A)–(D) in tooling formulations are listed below. The ranges are represented as pbw based on the total weight of the composition.

| Component | Ranges (pbw) |
| --- | --- |
| A | 10–50 |
| B | 1–10 |
| C | 1–7 |
| D | 30–80 |

Preferably, component (A) is in the range of 12–35 pbw, more preferably 15–22 pbw, component (B) is in the range of 1–5 pbw, more preferably 1.5–4 pbw; component (C) is in the range of 1–5 pbw, more preferably 1–3 pbw; and component (D) is in the range of 40–70 pbw, more preferably 55–70 pbw, pbw being based on the total weight of the composition.

The instant compositions may also include minor amounts of processing additives such as wetting agents, defoaming agents, toughening agents and the like. These are only present in such quantity as to assist in the preparation of the instant compositions. Their presence in such low concentration does not adversely affect the storage stability of the uncured composition or the Tg and CTE values obtained with the cured epoxy resin compositions of this invention.

CTE values are given in in/in/°F. (or cm/cm/°C.) units. This coefficient value indicates the amount in inches (or centimeters) that the cured resin composition expands or contracts per inch (or centimeter) of molded stock for each degree Fahrenheit (or Centigrade) the temperature is changed. Clearly low CTE values are desired.

In order to meet the overall requirements for an acceptable cured epoxy resin material which is useful in tooling applications, the cured composition should have a Tg value over 130° C., preferably over 140° C. and more preferably over 150° C., and a CTE value of less than $1.7 \times 10^{-5}$ cm/cm/°C. in the −30° C.–125° C. range.

To meet the overall requirements for a storage-stable epoxy resin material, the uncured resin composition should have a storage stability of at least four months, preferably at least one year, at ambient temperature (25° C. or less) or six months at 40° C. Stability can be measured by known methods such as viscosity, melting point, gel time or reproducibility of cured resin properties after storage.

The following examples are presented for the purpose of illustration only and are not to be construed to limit the nature or scope of the instant invention in any manner whatsoever.

EXAMPLE 1

Preparation of Epoxy Resin Composition

The epoxy resin tooling material in accordance with the instant invention is prepared by admixing the ingredients in the following proportions:

| Components | (pbw) |
| --- | --- |
| Epoxy phenol novolac resin[1] | 17.5 |
| Butanediol diglycidyl ether | 1.9 |
| Boron trichloride amine complex[2] | 1.0 |
| Borosilicate glass | 68.6 |
| Soda-lime-borosilicate glass bubbles | 5.0 |
| Calcium silicate | 1.9 |
| Fumed silica | 1.0 |
| Toughening agent | 3.0 |
| Defoaming agent | <0.1 |

[1]The epoxy phenol novolac resin is a mixture of the products EPN 1139 (epoxy value 0.56–0.58 eq/100 grams, available from Ciba-Geigy Corporation) and DEN 438 (epoxy value 0.55–0.57 eq./100 grams available from Dow Company).
[2]The boron trichloride amine complex is sold under the name DY 9577 (available from Ciba-Geigy Corporation).

The storage stability of the epoxy resin composition of Example 1 is measured in an oven at 40° C. after four months storage and at room temperature after one year of storage. No noticeable change in handling characteristics is observed after 4 months storage at 40° C. and after one year storage at room temperature.

EXAMPLE 2

Curing/Application of the Epoxy Resin Composition

The epoxy resin composition of Example 1 is formed in the shape of patties and laid down on a substructure. (The substructure may be as simple as a chicken-wire form or more elaborate such as machined high temperature modeling stock or a filled epoxy plastic tooling backup structure.) The patties are butted together and rolled out to create a fairly smooth, void-free-free surface on the substructure. After the entire substructure is covered with the tooling material, a heat cure is applied. The heat cure schedule is two hours at 250° F. (121° C.), followed by an additional three hours at 350° F. (177° C.).

The cured tooling material has a CTE of $14$–$17 \times 10^{-6}$ cm/cm/°C. over a temperature range of $-30°$ C.–$125°$ C. and a Tg of 162° C. The CTE measurement is based on the ASTM method D-3386 using a Perkin-Elmer TMA 7 analyzer. The Tg measurement data is based on the ASTM D-4065 using a Dupont DMA analyzer.

EXAMPLE 3

Preparation and Curing of a Comparative Epoxy Resin Composition

An epoxy resin composition is prepared by admixing the ingredients in the following proportions:

| Components | (pbw) |
| --- | --- |
| Epoxy phenol novolac resin[1] | 85.4 |
| Butanediol diglycidyl ether | 9.5 |
| Boron trichloride amine complex[2] | 5.0 |
| Defoaming agent | <0.1 |

[1]The epoxy phenol novolac resin is a mixture of the products EPN 1139 and DEN 438 in a weight ratio of 2.6:1, respectively.
[2]The boron trichloride amine complex is sold under the name DY 9577.

The storage stability of the epoxy resin composition is measured in an oven at 40° C. after four months storage and at room temperature after one year of storage. A less than 10% viscosity increase is observed after four months at 40° C. and one year at room temperature.

A heat cure is applied to the epoxy resin composition. The heat cure schedule is two hours at 121° C., followed by an additional three hours at 177° C.

The cured material has both a CTE and Tg, which is unacceptable for industrial tooling-type applications.

What is claimed is:

1. A semi-solid curable epoxy resin composition which is storage-stable at ambient temperature and which maintains, when cured, a post-cured high glass transition temperature (Tg) of above 130° C. and a low coefficient of thermal expansion (CTE) of less than $1.7 \times 10^{-5}$ cm/cm°C. over a temperature range of $-30°$ to $125°$ C., which composition comprises
    (A) an epoxy resin or mixture thereof;
    (B) a mono- or di-glycidyl resin diluent which is not the same as (A);
    (C) a boron trichloride amine complex; and
    (D) at least one filler selected from a silica or a silicate, wherein component (D) is present in the amount of about 30% to 80% by weight of said composition.

2. An epoxy resin composition according to claim 1 wherein the epoxy resin of component (A) is an epoxy phenol novolac.

3. An epoxy resin composition according to claim 1 wherein the epoxy resin of component (A) is a mixture of epoxy phenol novolacs.

4. An epoxy resin composition according to claim 1 wherein the epoxy resin of component (A) comprises at least one multifunctional epoxy resin.

5. An epoxy resin composition according to claim 1 wherein the diluent of component (B) is difunctional.

6. An epoxy resin composition according to claim 5 wherein the diluent is butanediol diglycidyl ether.

7. An epoxy resin composition according to claim 1 wherein the filler of component (D) is silica, aluminum silicate, calcium silicate or borosilicate glass, or a mixture thereof.

8. An epoxy resin composition according to claim 1 wherein, based on the total weight of the composition, component (A) is present in the amount of 10–50%; component (B) is present in the amount of 1–10%; component (C) is present in the amount of 1–7%; and component (D) is present in the amount of 30–80%.

9. An epoxy resin composition according to claim 1 further comprising processing additives.

10. An epoxy resin composition according to claim 1 which maintains a post-cured Tg of above 140° C.

11. An epoxy resin composition according to claim 10 which maintain a post-cured Tg of above 150° C.

12. An epoxy resin composition according to claim 1 which maintains a post-cured CTE of less than $1.6 \times 10^{-5}$ cm/cm/°C. over a temperature range of $-30°$ to $125°$ C.

13. A cured epoxy resin composition having a glass transition temperature (Tg) of above 130° C. and a coefficient of thermal expansion (CTE) of less than $1.7 \times 10^{-5}$ cm/cm/°C. over a temperature range of −30° to 125° C., which comprises the cured product of a semi-solid composition comprising (A) an epoxy resin or mixture thereof;

(B) a mono- or di-glycidyl resin diluent which is not the same as (A);

(C) a boron trichloride amine complex; and (D) at least one filler selected from a silica or a silicate, wherein component (D) is present in the amount of about 30% to 80% by weight of said composition.

14. A cured epoxy resin composition according to claim 13 wherein the epoxy resin of component (A) is an epoxy phenol novolac.

15. A cured epoxy resin composition according to claim 13 wherein the epoxy resin of component (A) is a mixture of epoxy phenol novolacs.

16. A cured epoxy resin composition according to claim 13 wherein the epoxy resin of component (A) comprises at least one multifunctional epoxy.

17. A cured epoxy resin composition according to claim 13 wherein the diluent of component (B) is difunctional.

18. A cured epoxy resin composition according to claim 17 wherein the diluent is butanediol diglycidyl ether.

19. A cured epoxy resin composition according to claim 13 wherein the filler of component (D) is silica, aluminum silicate, calcium silicate or borosilicate glass, or a mixture thereof.

20. A cured epoxy resin composition according to claim 13 wherein, based on the total weight of the composition, component (A) is present in the amount of 10–50%; component (B) is present in the amount of 1–10%; component (C) is present in the amount of 1–7%; and component (D) is present in the amount of 30–80%.

21. A cured epoxy resin composition according to claim 13 further comprising processing additives.

22. A cured epoxy resin composition according to claim 13 which has a Tg of above 140° C.

23. A cured epoxy resin composition according to claim 22 which has a Tg of above 150° C.

24. A cured epoxy resin composition according to claim 13 which has a CTE of less than $1.6 \times 10^{-5}$ cm/cm/°C. over a temperature range of −30° to 125° C.

25. A semi-solid composition according to claim 1 wherein component (D) is present in the amount of about 55 to 70% by weight.

* * * * *

UNITED STATES PATENT AND TRADEMARK OFFICE
CERTIFICATE OF CORRECTION

PATENT NO. : 5,859,096
DATED : JANUARY 12, 1999
INVENTOR(S) : JAMES EDWARD HOGE ET AL.

It is certified that error appears in the above-identified patent and that said Letters Patent is hereby corrected as shown below:

On the cover page, Section [60] should read:

-- Related U.S. Application Data

[60] Provisional application No. 60/013,970 March 22, 1996 --.

Column 1, line 7, "Mar.2, 1996" should read --Mar.22, 1996--.

Signed and Sealed this

Eighteenth Day of May, 1999

*Attest:*

Q. TODD DICKINSON

*Attesting Officer*      *Acting Commissioner of Patents and Trademarks*